United States Patent [19]

Mahoney

[11] Patent Number: 5,682,677
[45] Date of Patent: Nov. 4, 1997

[54] LINEAR FRICTION WELDING PROCESS FOR MAKING WHEEL RIMS

[75] Inventor: Murray Mahoney, Camarillo, Calif.

[73] Assignee: Rockwell Light Vehicle Systems, Inc., Troy, Mich.

[21] Appl. No.: 689,860

[22] Filed: Aug. 15, 1996

[51] Int. Cl.$^6$ .............................. B23K 27/00; B21H 1/10
[52] U.S. Cl. .................................. 29/894.35; 228/112.1
[58] Field of Search ................. 29/894.35, 894.351, 29/894.352, 894.353, 894.354; 228/2.1, 112.1

[56] References Cited

U.S. PATENT DOCUMENTS 3,771,706  11/1973  Martens ........................... 228/112.1
4,414,728  11/1983  Ford et al. ...................... 29/894.353

OTHER PUBLICATIONS

Nicholas, E.D., *Linear Friction Welding*, Undated, pp. 18–24, Abington/GB.

*Primary Examiner*—P. W. Echols

[57] ABSTRACT

A method of forming vehicle wheel rims includes utilizing linear friction welding. A generally planar piece of metal material is placed into a coil position with two ends in abutment. The abutting ends are oscillated or moved, in a generally linear pattern, relative to each other to increase the temperature of the metal at each end. After the temperature has been increased sufficiently, without reaching the melting temperature of the metal, the linear motion is stopped. The ends are then aligned precisely and forced together with an increased axial load. After cooling, the two ends are permanently joined together with an essentially defect-free welded joint.

11 Claims, 1 Drawing Sheet

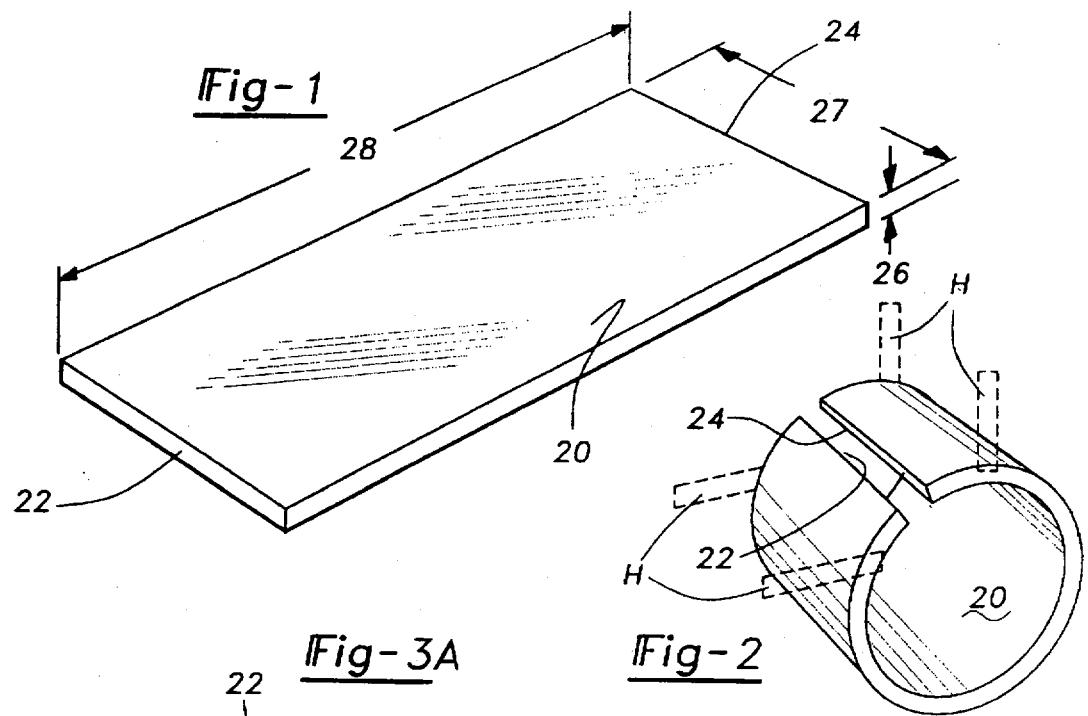
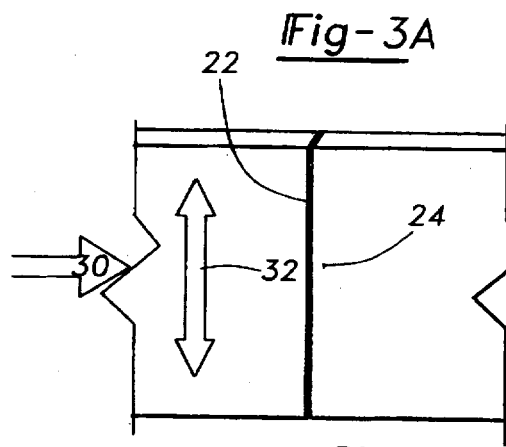
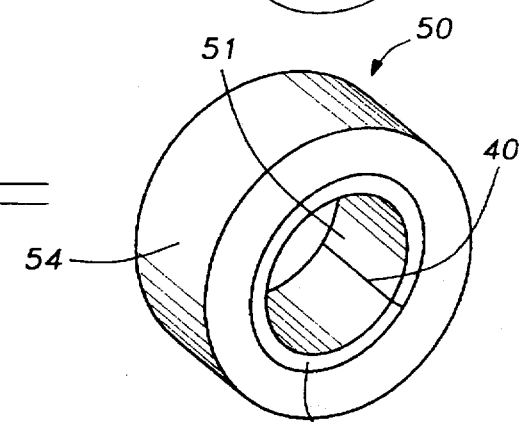
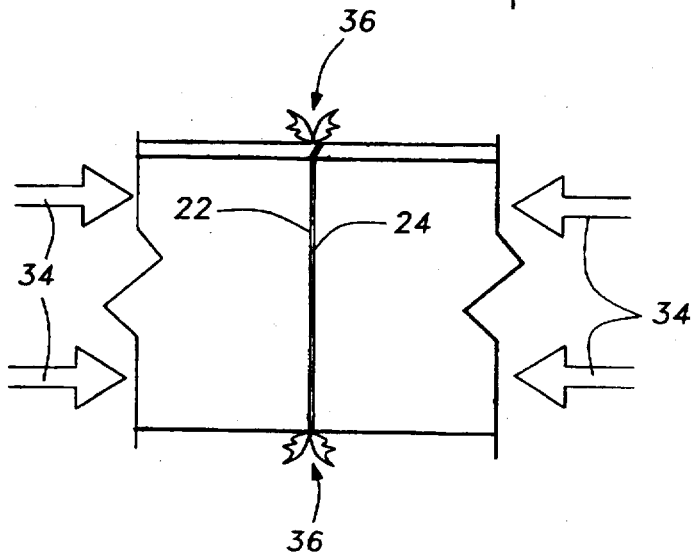
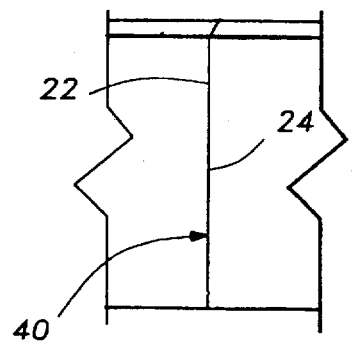

LINEAR FRICTION WELDING PROCESS FOR MAKING WHEEL RIMS

BACKGROUND OF THE INVENTION

This invention generally relates to a process for making vehicle wheel rims that includes using linear friction welding.

Currently, vehicle wheel rims are assembled with a process including flash butt welding prior to flanging and roll forming operations. Conventional wheel rim welding methods have a number of associated drawbacks. For example, flash butt welding causes the need for rework and introduces a potential for flat spot defects. Flat spot defects are detrimental in forming wheel rims because they can create continuous leak paths, which would render the wheel rim ineffective. Accordingly, during or after an assembly process, wheel rims need to be immersion leak inspected. This procedure is time consuming and can be burdensomely expensive because of the labor involved.

Further, flash butt welding requires high energy usage. Another disadvantage is the measures that must be taken to minimize risks associated with introducing pollutants into the air. Flash butt welding can also produce excessive flash, which adds to the initial raw material cost. Additionally, modern wheel rims are made from differing materials and it can be difficult to accommodate such materials in a flash butt welding process. Moreover, different welding machines are required to weld different materials such as steel or aluminum. Further, conventional welding practices such as flash butt welding alter the final microstructure in undesirable ways resulting in reduced formability. Accordingly, it is desirable to provide a process for assembling wheel rims that increases the speed of production and overcomes the other drawbacks associated with conventional processes.

This invention provides an assembly process that overcomes the drawbacks and shortcomings of conventional processes. Linear friction welding is utilized in the assembly process to provide more reliable welding joints and to eliminate the drawbacks associated with flash butt welding. Linear friction welding is a process that has been used and is known in the aerospace industry. Generally, it involves bringing two metal objects in direct contact under an axial load. The two objects are then moved relative to each other in a generally linear fashion to increase the temperature of the metal. Before the temperature reaches the melting point of the material, the relative linear motion is stopped and the axial load is increased forcing the two objects against each other. The result is a high strength bond having a uniform microcrystalline structure that is highly reliable.

SUMMARY OF THE INVENTION

In general terms, the method associated with this invention is for making a vehicle wheel rim out of a generally planar piece of metal. First, the piece of metal is manipulated into a generally cylindrical or coiled configuration. The piece of metal has two ends and the two ends are arranged to be directly facing each other when the piece of metal is in the cylindrical configuration. The first end is then forced against the second end. One end is then moved in a generally linear pattern relative to the other end while the two ends are maintained against each other. This relative linear movement increases the temperature of the metal in each end. After the temperature has been increased to a desirable point, but without reaching the melting temperature of the material, the relative linear movement is then stopped. Then one end is precisely aligned with and forced against the other end using a force having a higher magnitude than the force used to maintain the two ends together in the earlier steps. Because of the raised temperature of the metal and the increased force, the two ends are fixedly joined together.

The various features and advantages of this invention will become apparent to those skilled in the art from the following detailed description of the preferred embodiment. The drawings that accompany the detailed description can be described as follows.

BRIEF DESCRIPTION OF THE DRAWINGS

FIG. 1 is a perspective view of a piece of material to be used to form a wheel rim according to this invention.

FIG. 2 illustrates the material from FIG. 1 in a coiled configuration.

FIG. 3a illustrates a portion of the embodiment of FIG. 2 and schematically shows an initial phase of the joining process according to this invention.

FIG. 3b shows a later phase of the joining process according to this invention.

FIG. 3c schematically illustrates the completion of a joining process according to this invention.

FIG. 4 shows the final wheel.

DETAILED DESCRIPTION OF THE PREFERRED EMBODIMENT

FIG. 1 illustrates a generally planar piece of metal material 20. Suitable metal materials for use in a method according to this invention include aluminum alloys and steel alloys or other metal materials. The sheet of metal 20 has a thickness 26, a width 27 and a length 28. The thickness 26 and the width 27 define the size of a face at each end 22 and 24. In one example, the preferred thickness 26 is approximately 3 mm and the preferred width 27 is approximately 170 mm. The material dimensions will vary depending on the requirements for the wheel rim.

FIG. 2 illustrates the sheet of metal 20 placed in a generally cylindrical or coiled configuration. The faces of the first end 22 and the second end 24 are directly opposing each other. According to the method of this invention, the first face 22 is brought in direct contact with the second face 24. Designing the machinery for manipulating the piece of metal 20 from the generally flat configuration of FIG. 1 into the coiled configuration of FIG. 2 is within the ability of those skilled in the art and, therefore, need not be further described in this specification. Holding structure H is shown schematically, and can function to hold the ends together, and also to move one end relative to the other.

FIG. 3a schematically illustrates the beginning phases of the joining process according to this invention. The first end 22 is placed in direct contact with the second end 24. Importantly, the entire face of the first end 22 is perfectly aligned with the entire face of the second end 24. The two ends are forced together using a force schematically illustrated by the arrows 30. While maintaining the two ends in contact, the first end 22 is oscillated or moved in a generally linear path relative to the second end 24. The first end 22 preferably is oscillated back and forth as schematically illustrated by the arrows 32. The first end 22 preferably is moved a distance of approximately 3 mm in each direction at a frequency of approximately 70 to 100 Hz. This process is continued until a temperature increase occurs in the first end 22 and the second end 24.

FIG. 3b schematically illustrates a subsequent portion of the assembly process. After the temperature of the metal in the first and second ends has been increased appropriately, the relative linear or oscillating motion is stopped. Importantly, the linear motion is stopped before the temperature of the metal reaches its melting point. After the relative linear movement is stopped, the first end 22 is moved to be perfectly aligned with the face of the second end 24. Then, an increased force, schematically illustrated by the arrows 34, forces the first end against the second end. Because of the increased temperature in the first and second end, a flash 36 of material is extruded between the first end 22 and the second end 24. Any undesirable flash can be removed before or after it cools. After cooling, the first end 22 is permanently bonded to the second end 24.

FIG. 3c schematically illustrates a completed joint 40 between the first end 22 and the second end 24. After the above procedures are completed, the wheel rim can be flared and roll formed according to conventional methodology in order to bring the wheel rim into the desired shape.

Assembling wheel rims according to this invention provides significant advantages. These advantages include a relatively large savings in raw material cost because of reduced flash, eliminating the need for later leak inspection because of the accuracy and reliability of the linear friction welding procedure described above, reduced energy consumption, and eliminating the introduction of pollutants into the air. Moreover, the assembly process, according to this invention, results in a fine grain, fully recrystallized microstructure that is free of defects. Further, the wheel rim cylinder has excellent formability during the flaring and roll forming processes. Additionally, separate machinery is not required for different materials. In other words, steel alloys and aluminum alloys can be utilized in the same machine when the wheel rim is formed according to the method of this invention.

FIG. 4 shows the final wheel 50 having a rim 51 with roll formed edges 52 and a tire 54 mounted on the rim 51. As set forth above, the inventive method improves the quality of the wheel 50.

The above description is exemplary rather than limiting in nature. Variations and modifications to the disclosed embodiment will become apparent to those skilled in the art that do not necessarily depart from the spirit of this invention. Accordingly, the legal scope given to this invention can only be determined by studying the appended claims.

I claim:

1. A method of making a vehicle wheel rim, comprising the steps of:
   (a) manipulating a generally planar piece of metal, having a first and second longitudinal end, into a generally cylindrical configuration with the first end facing the second end;
   (b) forcing the first end against the second end using a first force having a first magnitude and a direction that is generally tangential to said cylindrical configuration where said ends are forced against each other;
   (c) moving the first end relative to the second end while maintaining the first end against the second end to thereby increase a temperature of each end; and
   (d) forcing the first end against the second end using a second force having said direction and a second magnitude that is greater than the first magnitude such that the two ends are fixedly joined together.

2. The method of claim 1, wherein step (C) is performed by moving the first end along a generally linear path.

3. The method of claim 2, wherein step (C) is performed by repeatedly moving the first end along a generally linear path in a first direction for a preselected distance and in an opposite direction for a preselected distance.

4. The method of claim 3, wherein the generally linear path is generally parallel to an axis of the cylindrical configuration.

5. The method of claim 1, wherein step (D) includes the substeps of stopping the movement of step (C); aligning the first and second ends in a preselected alignment; forcing the first end against the second end; and thereafter allowing the first and second ends to cool.

6. The method of claim 1, wherein the piece of metal comprises an aluminum alloy.

7. The method of claim 1, wherein the piece of metal comprises a steel alloy.

8. The method of claim 1, further comprising the step of machining the rim to form edges after performing step (D).

9. A method of making a vehicle wheel rim, comprising the steps of:
   (a) manipulating a piece of metal, having a first and second longitudinal end with a length, into a generally cylindrical configuration with the first end facing the second end;
   (b) forcing the first end against the second end using a first force having a first magnitude and a direction that is generally tangential to said cylindrical configuration where said first end faces said second end;
   (c) moving the first end relative to the second end while maintaining the first end against the second end to thereby increase a temperature of each end;
   (d) stopping the movement of step (c);
   (e) holding the first end against the second end such that the entire length of the first end is in contact and aligned with the entire length of the second end;
   (f) forcing the first end against the second end using a second force having said direction and a second magnitude that is greater than the first magnitude; and
   (g) allowing the temperature of the first and second ends to decrease such that the two ends are fixedly joined together.

10. The method of claim 9, wherein step (D) is performed before the temperature from step (C) has reached a predetermined melting temperature of the metal.

11. The method of claim 9, further comprising the step of (H) roll forming the rim after performing step (G) to form edges on the rim.

* * * * *